US009139103B2

United States Patent
Blakemore et al.

(10) Patent No.: US 9,139,103 B2
(45) Date of Patent: Sep. 22, 2015

(54) BATTERY CELL CAPACITY BALANCING SYSTEM AND METHOD

(75) Inventors: Bruce Carvell Blakemore, Plymouth, MI (US); Allan Roy Gale, Livonia, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 13/192,528

(22) Filed: Jul. 28, 2011

(65) Prior Publication Data

US 2013/0030620 A1   Jan. 31, 2013

(51) Int. Cl.
| B60L 9/00 | (2006.01) |
| B60L 11/00 | (2006.01) |
| H01M 6/42 | (2006.01) |
| H02J 7/00 | (2006.01) |
| B60L 11/18 | (2006.01) |
| H01M 10/42 | (2006.01) |
| H01M 10/44 | (2006.01) |
| H01M 10/48 | (2006.01) |

(52) U.S. Cl.
CPC ............ B60L 11/1866 (2013.01); H01M 10/42 (2013.01); H01M 10/44 (2013.01); H01M 10/48 (2013.01); H02J 7/0016 (2013.01); *Y02T 10/7005* (2013.01); *Y02T 10/7055* (2013.01); *Y02T 10/7061* (2013.01)

(58) Field of Classification Search
CPC ............... B60W 10/06; B60W 10/26; B60W 2510/244; Y10S 903/903; B60L 11/1861; B60L 11/1862; B60L 15/2045; B60L 11/1809; B60L 11/1851; B60L 11/1868
USPC .............................. 701/22; 320/128; 429/150
See application file for complete search history.

(56) References Cited

U.S. PATENT DOCUMENTS

| 4,079,303 | A | * | 3/1978 | Cox ............................. 320/119 |
| 5,615,129 | A | * | 3/1997 | Stich et al. ................... 700/297 |
| 5,659,237 | A | | 8/1997 | Divan et al. |
| 5,782,880 | A | | 7/1998 | Lahtinen et al. |
| 5,869,951 | A | | 2/1999 | Takahashi |
| 6,114,835 | A | * | 9/2000 | Price ............................. 320/118 |
| 6,451,463 | B1 | | 9/2002 | Tsai et al. |
| 6,646,419 | B1 | | 11/2003 | Ying |
| 7,091,700 | B2 | | 8/2006 | Kadouchi et al. |
| 7,245,108 | B2 | | 7/2007 | Chertok et al. |
| 7,274,170 | B2 | | 9/2007 | Benckenstein, Jr. et al. |
| 7,489,106 | B1 | | 2/2009 | Tikhonov |
| 8,207,740 | B2 | | 6/2012 | Lin et al. |
| 2003/0152830 | A1 | | 8/2003 | Eaves |
| 2006/0119319 | A1 | | 6/2006 | Sakurai et al. |
| 2007/0257641 | A1 | | 11/2007 | Sada et al. |
| 2008/0197707 | A1 | | 8/2008 | Yang |
| 2010/0261048 | A1 | | 10/2010 | Kim et al. |
| 2011/0025258 | A1 | * | 2/2011 | Kim et al. ..................... 320/106 |
| 2011/0078092 | A1 | | 3/2011 | Kim et al. |
| 2011/0093223 | A1 | | 4/2011 | Quet |

\* cited by examiner

*Primary Examiner* — Behrang Badii
*Assistant Examiner* — Daniel L Greene
(74) *Attorney, Agent, or Firm* — David B. Kelley; Brooks Kushman P.C.

(57) ABSTRACT

A power system for a vehicle may include at least one controller and a battery having a plurality of cells. The at least one controller may, for each of the cells, determine a capacity of the cell, determine a duration of time to supply cell load current to reduce the determined capacity of the cell to a value approximately equal to a minimum of the determined capacities, and cause the cell to supply cell load current for the determined duration of time to balance the battery.

17 Claims, 3 Drawing Sheets

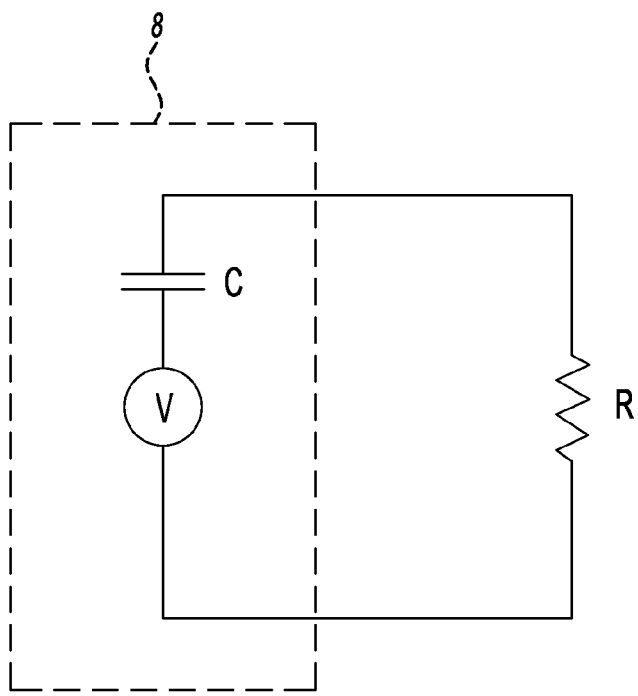
_Fig-1_
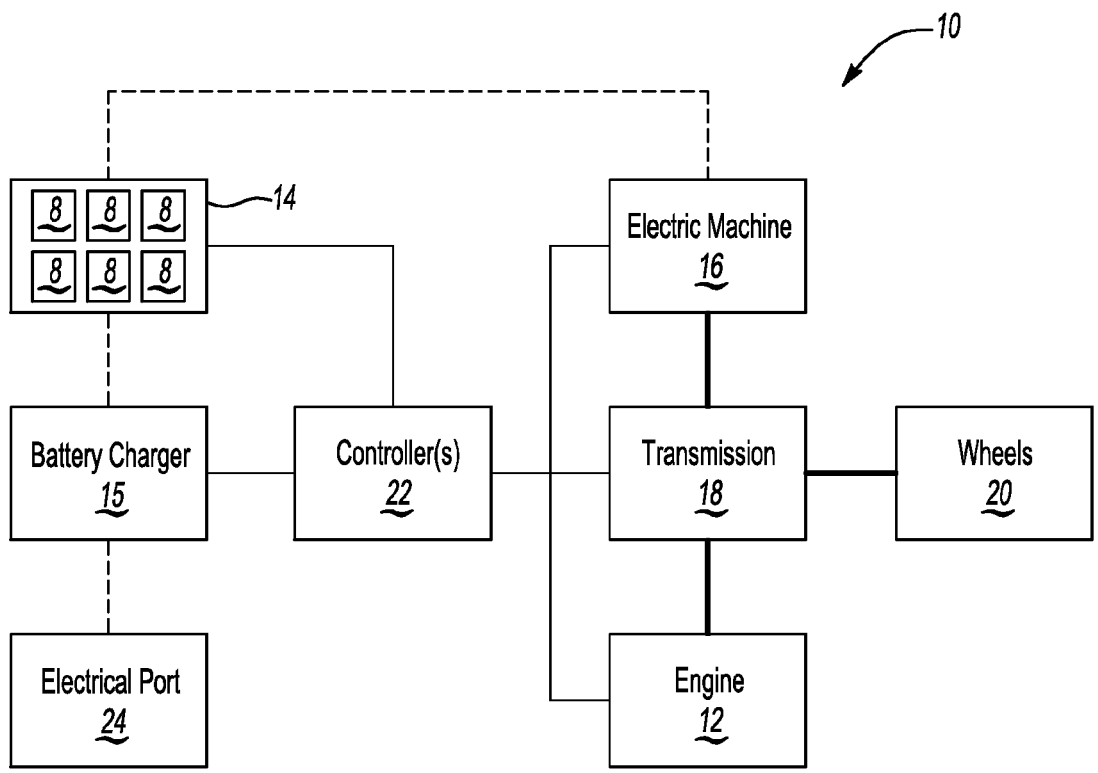
_Fig-2_

BATTERY CELL CAPACITY BALANCING SYSTEM AND METHOD

BACKGROUND

Vehicle battery rebalancing is performed to correct cell imbalance conditions. The voltage of each of the cells is measured and the cell having the minimum voltage identified. All other cells are bled down via resistive circuitry associated with each cell until the other cells have a measured voltage approximately equal to the minimum. Continuous/periodic cell voltage measurements are taken during the bleed down process to monitor change in the cell voltages. Once all of the cell voltage readings are approximately equal, the battery is charged.

SUMMARY

A method of balancing a vehicle battery having a plurality of cells may include, for each of the cells, determining a capacity of the cell, determining a duration of time to supply cell load current to reduce the determined capacity of the cell to a target value, and causing the cell to supply cell load current for the determined duration of time.

BRIEF DESCRIPTION OF THE DRAWINGS

FIG. 1 is a schematic diagram of a cell and its resistive circuitry.

FIG. 2 is a block diagram of an alternatively powered vehicle.

DETAILED DESCRIPTION

Figure 3:
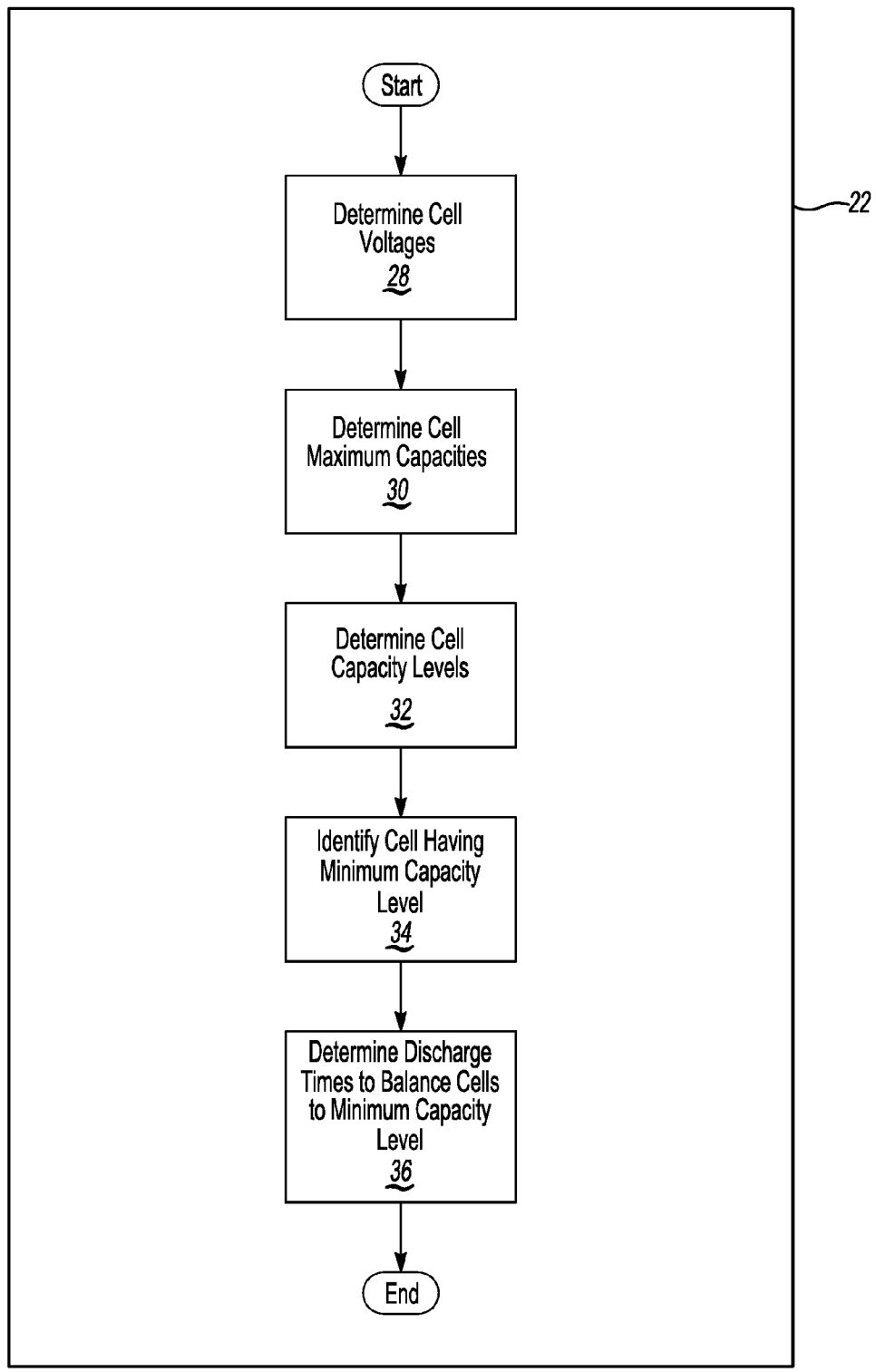
FIG. 3 is a flow chart illustrating an algorithm for determining times associated with rebalancing the battery of FIG. 2.

A manufacturer of alternatively powered vehicles (e.g., battery electric vehicles, etc.) may desire to provide vehicles that can be driven for a specified range after battery rebalancing/charging. The drive range of a battery powered vehicle depends on the amount of energy stored by its battery. Conventional battery rebalancing techniques attempt to make the battery cell voltages equal before charging the battery cells to a target voltage. For a given cell voltage, however, cell energy content can vary (e.g., decrease) over time due to cell aging. Hence, the amount of energy stored by the battery (and thus vehicle range) can decrease over time if the cells continue to be charged to the same target voltage.

Certain embodiments disclosed herein may provide systems and techniques that balance/charge cells of a battery to a target capacity rather than a target voltage. Thus, a specified vehicle drive range can be provided.

Cell Capacity

A battery cell's maximum capacity, $Ihr_{max}$, may be found according to the relationship $$Ihr_{max} = \frac{\Delta Ihr}{\Delta SOC} \quad (1)$$

where $\Delta Ihr$ is the change in capacity in the cell and $\Delta SOC$ is the change in state of charge of the cell. As an example, the SOC of a given cell may be determined before and after 1 A·hr of capacity is provided to it. Assuming a measured $\Delta SOC$ of 10% for this example, the cell's maximum capacity, $Ihr_{max}$, would be 10 A·hrs according to (1).

Cell Energy Content

A battery cell's energy content, $\epsilon$, may be approximated from the following sets of equations $$\epsilon = \int \rho \cdot dt \quad (2)$$

where $\rho$ is the power applied to the cell. $\rho$ may be written as $$\rho = v_m \cdot i \quad (3)$$

where $v_m$ is the (measured) voltage associated with the power stored and i is the current associated with the power stored. Substituting (3) into (2) yields $$\epsilon = \int v_m \cdot i \cdot dt \quad (4)$$

$v_m$ may be written as $$v_m = \Delta v + v_{min} \quad (5)$$

where $v_{min}$ is the voltage of the cell at 0% state of charge (e.g., 3.1 V) and $\Delta v$ is the difference between the voltage associated with the power stored and the voltage of the cell at 0% state of charge. Substituting (5) into (4) yields $$\epsilon = \int (\Delta v + v_{min}) i \, dt \quad (6)$$

$\Delta v$ may be written as $$\Delta v = \frac{v_{max} - v_{min}}{Ihr_{max}} \cdot i \cdot t \quad (7)$$

where $v_{max}$ is the voltage of the cell at full state of charge, $Ihr_{max}$ is the cell's maximum capacity, and t is the time over which the change in voltage occurs. ((7) may be used to find the capacity of a particular cell 8 by solving for i·t (cell capacity) and setting $\Delta v$ equal to the measured voltage of the particular cell 8). Substituting (7) into (6) yields $$\epsilon = \int \left( \left( i \cdot \frac{v_{max} - v_{min}}{Ihr_{max}} \cdot t \right) + v_{min} \right) i \, dt \quad (8)$$

Integrating (8) yields $$\epsilon = i^2 \cdot \frac{v_{max} - v_{min}}{Ihr_{max}} \cdot \frac{t^2}{2} + v_{min} \cdot i \cdot t \quad (9)$$

i·t may be written as $$i \cdot t = Ihr \quad (10)$$

which is the capacity in the cell. Substituting (10) into (9) yields $$\epsilon = \frac{v_{max} - v_{min}}{Ihr_{max}} \cdot \frac{Ihr^2}{2} + v_{min} \cdot Ihr \quad (11)$$

Discharge Time to Achieve Target Cell Capacity

Referring to FIG. 1, a battery cell 8 (and its associated resistive bleed down circuitry) may be modeled as a standard RC circuit. Hence, the relationship between the measured voltage, $v_m$, of a cell and a target voltage, $v_t$, may be given by $$v_t = v_m \cdot (e^{-t/RC}) \quad (12)$$

where t is the time constant for the circuit, R is the resistance of the resistive circuitry (e.g., 4 kΩ), and C is the equivalent cell capacitance. C may be written as $$C = I \cdot \frac{dt}{dv} \quad (13)$$

I·dt may be written as $$I \cdot dt = Ihr \quad (14)$$

which is the capacity (A·hrs) of the cell 8, and dv may be written as $$dv = v_{max} - v_{min} \quad (15)$$

where $v_{max}$ is the cell voltage at full state of charge (e.g., 4.0 V) and $v_{min}$ is the cell voltage at 0% state of charge (e.g., 3.1 V). Substituting (14) and (15) into (13) yields $$C = \frac{Ihr_{max}}{v_{max} - v_{min}} \quad (16)$$

Rearranging (12) yields $$t = -R \cdot C \cdot \ln\frac{v_t}{v_m} \quad (17)$$

The discharge time, t, during which a cell may supply a cell load current to achieve a desired cell capacity (that is lower than the cell's current capacity) may be found by evaluating (17). R is known by design, C may be found from (16), and $v_m$ can be measured. $v_t$ corresponds to the voltage of the cell at the desired cell capacity. By evaluating (7) as described above to determine the capacity of each of the cells 8, the minimum of the cell capacities may be identified. This minimum is, in this example, the desired cell capacity. (7) may again be evaluated, for each cell, to determine the cell voltage that corresponds to the desired capacity by setting Δv equal to $v_t$ and i·t equal to the desired capacity.

Cell Capacity Balancing

Referring to FIG. 2, an embodiment of a plug-in hybrid electric vehicle (PHEV) 10 may include an engine 12, a plurality of cells 8 forming a traction battery 14, battery charger 15, and electric machine 16. The PHEV 10 may also include a transmission 18, wheels 20, controller(s) 22, and electrical port 24. The engine 12, electric machine 16 and wheels 20 are mechanically connected with the transmission 18 (as indicated by thick lines) in any suitable/known fashion such that the engine 12 and/or electric machine 16 may drive the wheels 20, the engine 12 and/or wheels 20 may drive the electric machine 16, and the electric machine 16 may drive the engine 12. Other configurations, such as a battery electric vehicle (BEV) configuration, etc., are also possible.

The battery 14 may provide energy to or receive energy from the electric machine 16 (as indicated by dashed line). The battery 14 may also receive energy from a utility grid or other energy source (not shown) via the electrical port 24 and battery charger 15 (as indicated by dashed line).

The controller(s) 22 are in communication with and/or control the engine 12, battery 14, battery charger 15, electric machine 16, and transmission 18 (as indicated by thin lines).

Referring to FIGS. 2 and 3, the controller(s) 22 may determine (e.g., measure, read, etc.) the voltage of each of the cells 8 at operation 28. At operation 30, the controller(s) 22 may determine the maximum capacity of each of the cells 8 using, for example, the techniques described with respect to (1). At operation 32, the controller(s) 22 may determine the capacity of each of the cells 8 using, for example, the techniques described with respect to (7). At operation 34, the controller(s) 22 may identify the cell having the minimum capacity. At operation 36, the controller(s) 22 may determine the discharge times to balance each of the cells 8 (except the cell having the minimum capacity) to the minimum of the capacities using, for example, the techniques described with respect to (17).

Figure 4:
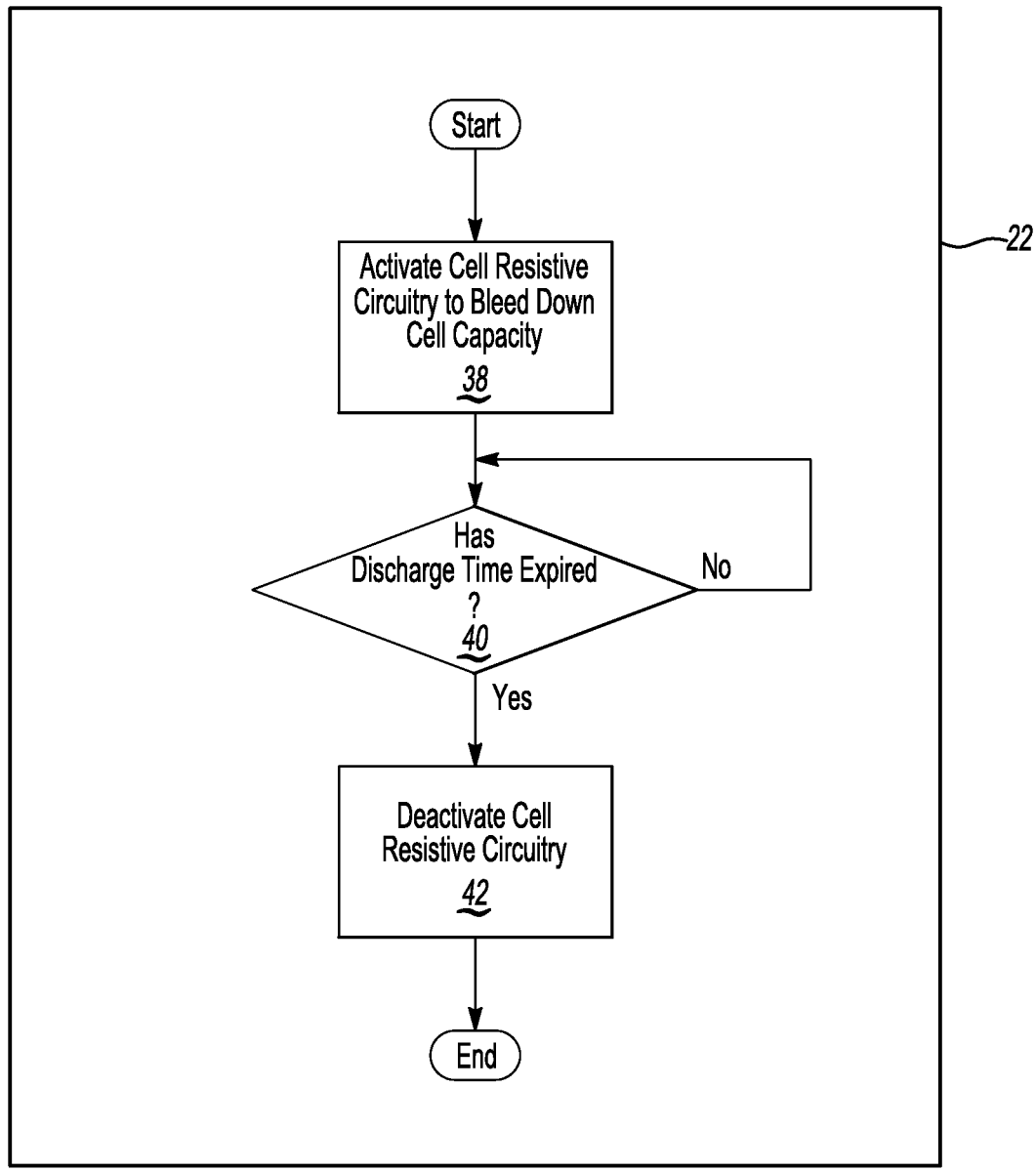
FIG. 4 is a flow chart illustrating an algorithm for bleeding down cells of the battery of FIG. 2.

Referring to FIGS. 2 and 4, the controller(s) 22 may activate, for each of the cells 8, the resistive circuitry to cause the cells to supply cell load currents to bleed down the cell capacities to the minimum at operation 38. The minimum, in this example, is equal to the minimum of the cell capacities determined at operation 34 (FIG. 2). At operation 40, the controller(s) 22 may determine whether, for each of the cells 8, the cell's discharge time has expired. If no, the algorithm returns to operation 40. That is, for any of the cells 8 whose discharge time has yet to expire, the algorithm returns to operation 40. If yes, the controller(s) 22 may deactivate the cell resistive circuitry at operation 42. That is, for any of the cells 8 whose discharge time has expired, the controller(s) 22 deactivate their resistive circuitry.

Cell Capacity Needed to Provide Specified Energy Content

Once the resistive circuitry for all of the cells 8 has been deactivated, the controller(s) 22 may then operate to charge the battery to some desired level. For example, the cells 8 may be charged to a target level to support a desired vehicle drive range while minimizing battery degradation.

Assume, for example, that a given battery pack having 20 cells needs to store at least 30 kW·hrs of energy to support a drive range of 100 miles. That is, the sum of energies stored by the cells of the battery pack should be at least equal to 30 kW·hrs. (11) may then be evaluated for each of the cells. An initial value (e.g., 1 A·hr) for Ihr may be assumed, $v_{max}$ and $v_{min}$ are known by design, and $Ihr_{max}$ can be determined from (1). If the sum of the cell energies is less than, in this example, 30 kW·hrs, the value for Ihr may be incremented by, for example, 1 A·hr and (11) evaluated again for each of the cells iteratively until the sum of the cell energies is at least equal to 30 kW·hrs. The capacity value resulting in the sum of the cell energies being at least equal to 30 kW·hrs is the target capacity value.

The algorithms disclosed herein may be deliverable to/implemented by a processing device, such as the battery charger 15 or controller(s) 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle comprising:
   an electric machine;
   a battery including a plurality of cells configured to store energy for the electric machine; and
   at least one controller configured to cause the cells to each supply cell load current for a specified duration of time to reduce Amp·hours stored in the cells to a specified common target value resulting in voltages of at least some of the cells being different.

2. The vehicle of claim 1 wherein the target value is approximately equal to a minimum of the Amp·hours initially stored in each of the cells.

3. The vehicle of claim 1 wherein the at least one controller is further configured to cause the cells to acquire charge.

4. The vehicle of claim 1 wherein, for each of the cells, the duration of time is based on a corresponding maximum Amp·hours of the cell.

5. The vehicle of claim 1 wherein, for each of the cells, the duration of time is based on a difference between a voltage of the cell at full state of charge and a voltage of the cell at 0% state of charge.

6. The vehicle of claim 1 wherein, for each of the cells, the duration of time is based on a voltage of the cell.

7. A method of balancing a vehicle battery including a plurality of cells, the method comprising:
   for each of the cells,
      causing, by a controller, the cell to supply cell load current for a specified duration of time to reduce an Amp·hours stored in the cell to a specified target value resulting in voltages of at least some of the cells being different.

8. The method of claim 7 wherein, for each of the cells, the duration of time is based on a maximum Amp·hours of the cell.

9. The method of claim 7 wherein, for each of the cells, the duration of time is based on a difference between a voltage of the cell at full state of charge and a voltage of the cell at 0% state of charge.

10. The method of claim 7 wherein, for each of the cells, the duration of time is based on a voltage of the cell.

11. The method of claim 7 wherein the target value is approximately equal to a minimum of the Amp·hours initially stored in the cells.

12. The method of claim 7 further comprising causing the cells to acquire charge.

13. A power system for a vehicle comprising:
   a battery including a plurality of cells; and
   at least one controller configured to cause the cells to each supply cell load current for a specified duration of time to reduce Amp·hours stored in the cells to a specified common target value resulting in voltages of at least some of the cells being different.

14. The system of claim 13 wherein the at least one controller is further configured to cause the cells to acquire charge.

15. The system of claim 13 wherein, for each of the cells, the duration of time is based on a maximum Amp·hours of the cell.

16. The system of claim 13 wherein, for each of the cells, the duration of time is based on a difference between a voltage of the cell at full state of charge and a voltage of the cell at 0% state of charge.

17. The system of claim 13 wherein, for each of the cells, the duration of time is based on a voltage of the cell.

* * * * *